United States Patent
Tesson et al.

(10) Patent No.: US 11,738,521 B2
(45) Date of Patent: Aug. 29, 2023

(54) PROCESS FOR MANUFACTURING A FIBROUS PREFORM FOR REINFORCEMENT OF PARTS MADE OF COMPOSITE MATERIAL WITH A HIGH LOCAL VARIATION IN THICKNESS

(71) Applicant: SAFRAN CERAMICS, Le Haillan (FR)

(72) Inventors: Thierry Guy Xavier Tesson, Moissy-Cramayel (FR); Marie Lefebvre, Moissy-Cramayel (FR); David Mathieu Paul Marsal, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/625,233

(22) PCT Filed: Jul. 1, 2020

(86) PCT No.: PCT/FR2020/051153
§ 371 (c)(1),
(2) Date: Jan. 6, 2022

(87) PCT Pub. No.: WO2021/005286
PCT Pub. Date: Jan. 14, 2021

(65) Prior Publication Data
US 2022/0274354 A1    Sep. 1, 2022

(30) Foreign Application Priority Data
Jul. 10, 2019    (FR) ........................................ 1907716

(51) Int. Cl.
*B29C 70/48* (2006.01)
*B29C 70/10* (2006.01)
(Continued)

(52) U.S. Cl.
CPC .............. *B29C 70/24* (2013.01); *B29B 11/12* (2013.01); *B29B 11/16* (2013.01); *B29C 70/48* (2013.01);
(Continued)

(58) Field of Classification Search
CPC ................................ B29C 70/24; B29C 70/48
See application file for complete search history.

(56) References Cited

U.S. PATENT DOCUMENTS

| 5,211,967 A | * | 5/1993 | Yasui | ...................... B29C 70/24 |
| | | | | 139/384 R |
| 7,101,154 B2 | | 9/2006 | Dambrine et al. | |

(Continued)

FOREIGN PATENT DOCUMENTS

| EP | 2 706 240 A2 | 3/2014 |
| EP | 2 706 241 A2 | 3/2014 |

(Continued)

OTHER PUBLICATIONS

International Preliminary Report on Patentability and the Written Opinion of the International Searching Authority as issued in International Patent Application No. PCT/FR2020/051153, dated Jan. 11, 2022.

(Continued)

*Primary Examiner* — Matthew J Daniels
(74) *Attorney, Agent, or Firm* — Pillsbury Winthrop Shaw Pittman LLP

(57) ABSTRACT

A manufacturing process of a fibrous preform for a composite material includes creating a fibrous texture by three-dimensional or multilayer weaving between a plurality of weft layers and warp layers, the fibrous texture including an extra-thick portion having a sacrificial portion and a useful portion adjacent to the sacrificial portion in the warp direction, the sacrificial portion, placing the fibrous texture in a (Continued)

forming toolset, shaping the fibrous texture so as to obtain a fibrous preform having a sacrificial portion and an adjacent useful portion, removing the sacrificial portion from the fibrous preform. When weaving the fibrous blank, one or more expansion elements are inserted into the weft layers located at the core of the sacrificial portion of the fibrous texture. Each expansion element has a cross-section greater than the cross-section or count of the weft threads or strands present in the useful portion.

8 Claims, 8 Drawing Sheets

(51) Int. Cl.
  *B29C 70/24* (2006.01)
  *B29B 11/12* (2006.01)
  *B29B 11/16* (2006.01)
  B29K 105/08 (2006.01)
  B29L 31/08 (2006.01)

(52) U.S. Cl.
  CPC ............... *B29K 2105/089* (2013.01); *B29L 2031/082* (2013.01)

(56) References Cited

U.S. PATENT DOCUMENTS

| | | | |
|---|---|---|---|
| 7,241,112 | B2 | 7/2007 | Dambrine et al. |
| 2011/0311368 | A1 | 12/2011 | Coupe et al. |
| 2013/0302604 | A1* | 11/2013 | Branscomb ............ D02G 3/442 428/374 |
| 2014/0072443 | A1* | 3/2014 | Mateo .................... F01D 5/282 29/889.71 |

FOREIGN PATENT DOCUMENTS

| | | |
|---|---|---|
| FR | 3 046 563 A1 | 7/2017 |
| FR | 3 046 564 A1 | 7/2017 |
| WO | WO 2010/061140 A1 | 6/2010 |
| WO | WO 2014/053751 A1 | 4/2014 |

OTHER PUBLICATIONS

International Search Report as issued in International Patent Application No. PCT/FR2020/051153, dated Dec. 1, 2020.

* cited by examiner

[Fig.1]
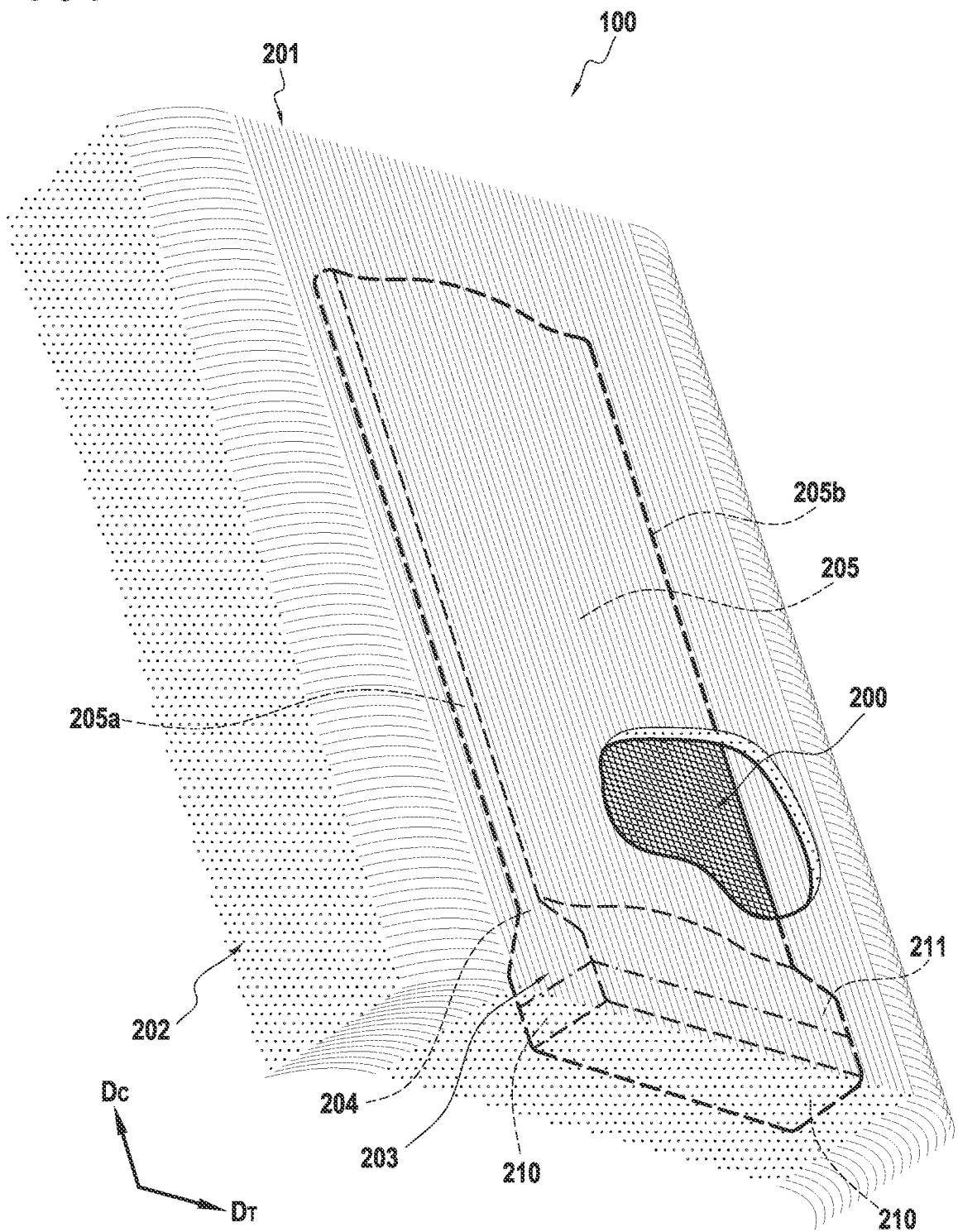

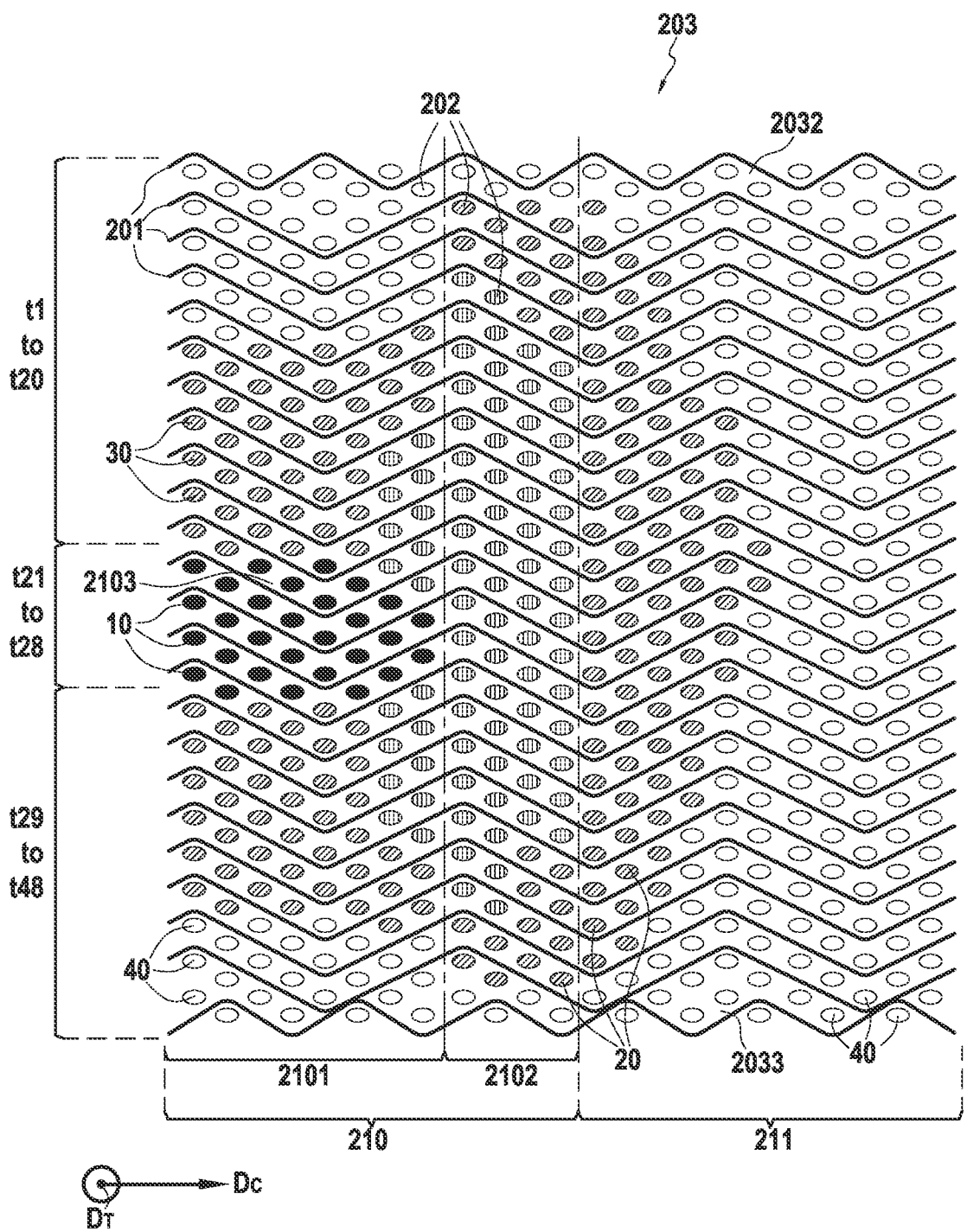
[Fig.2]

[Fig.3]
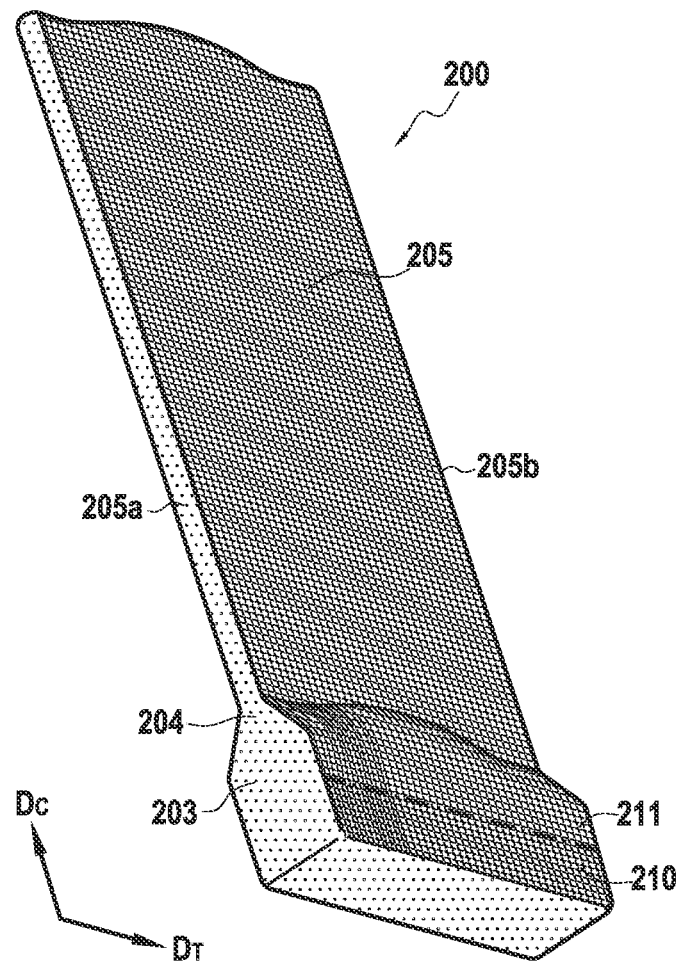

[Fig.4]
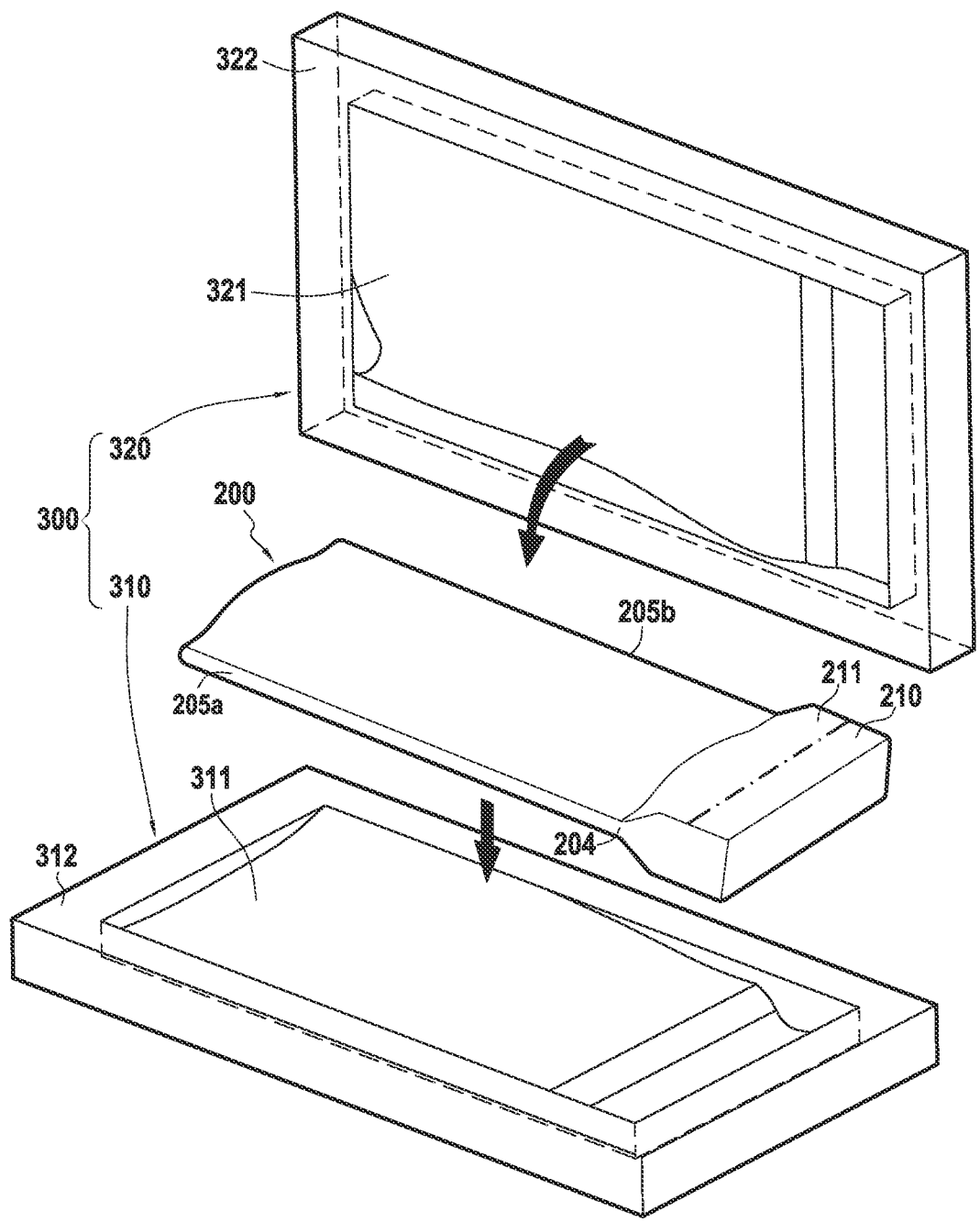

[Fig.5]
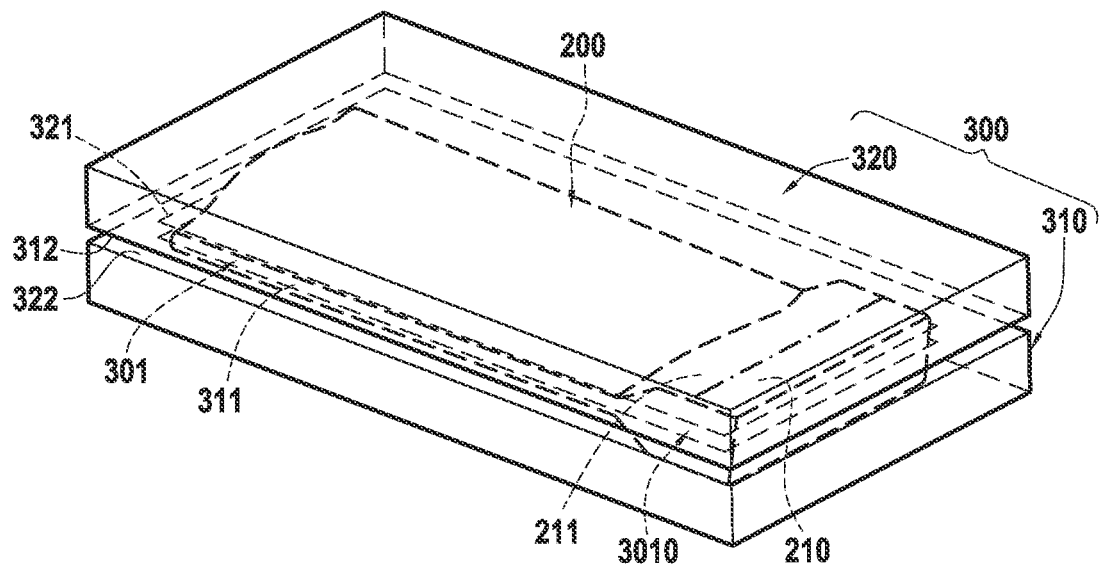
[Fig.6]
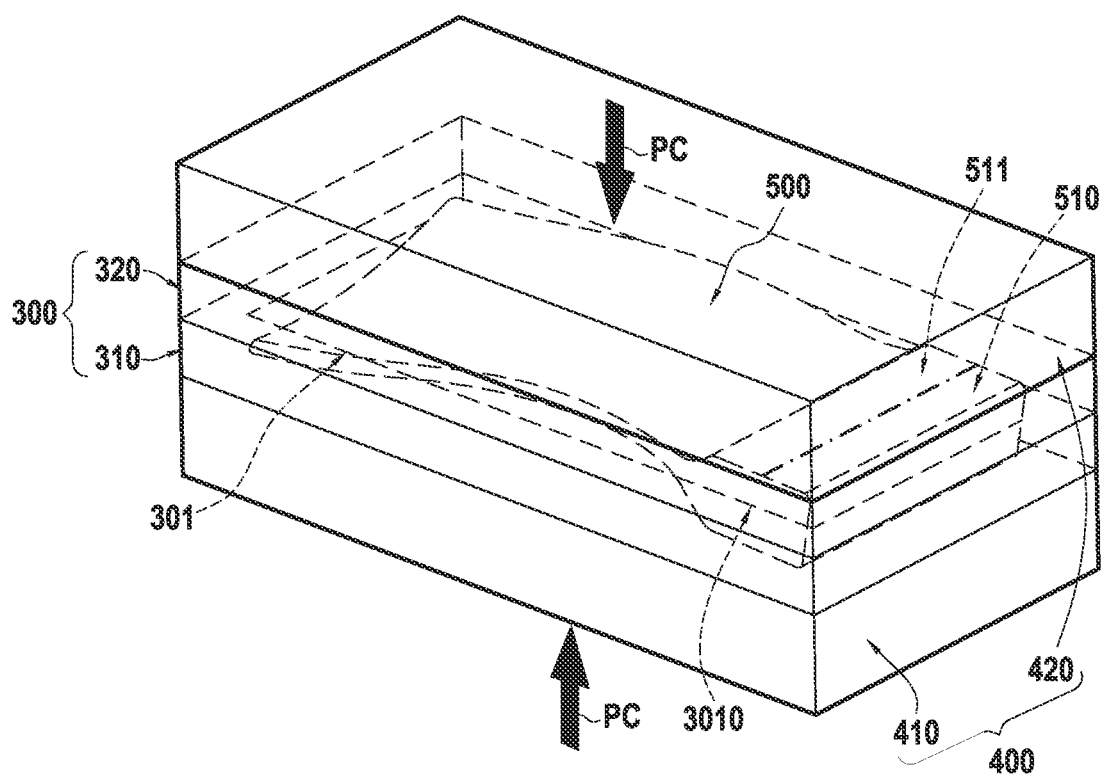

[Fig.7]
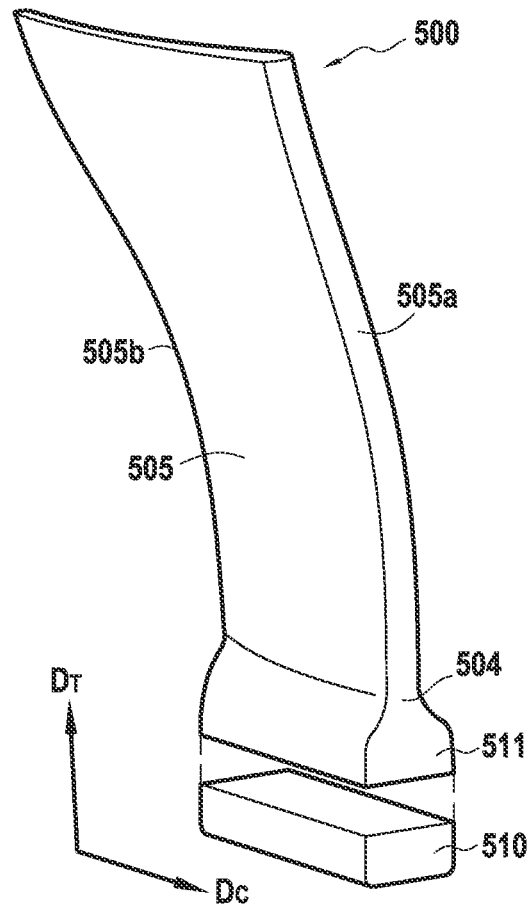

[Fig.8]
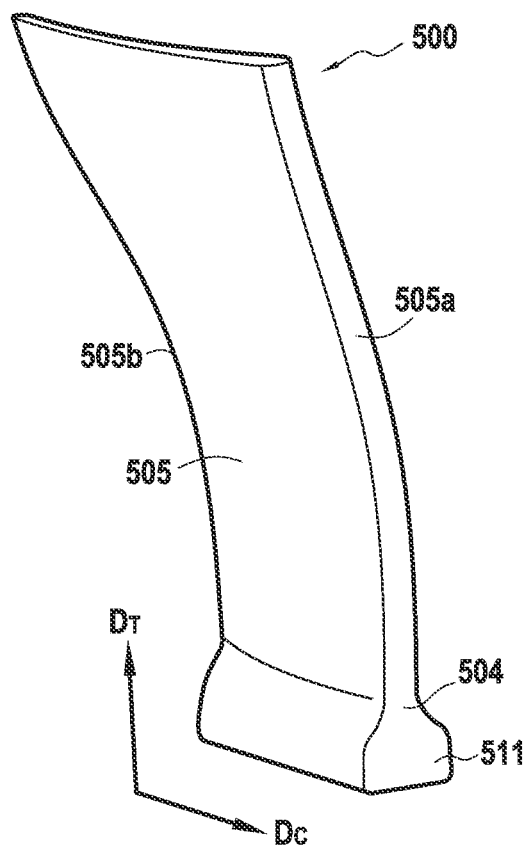
[Fig.9]
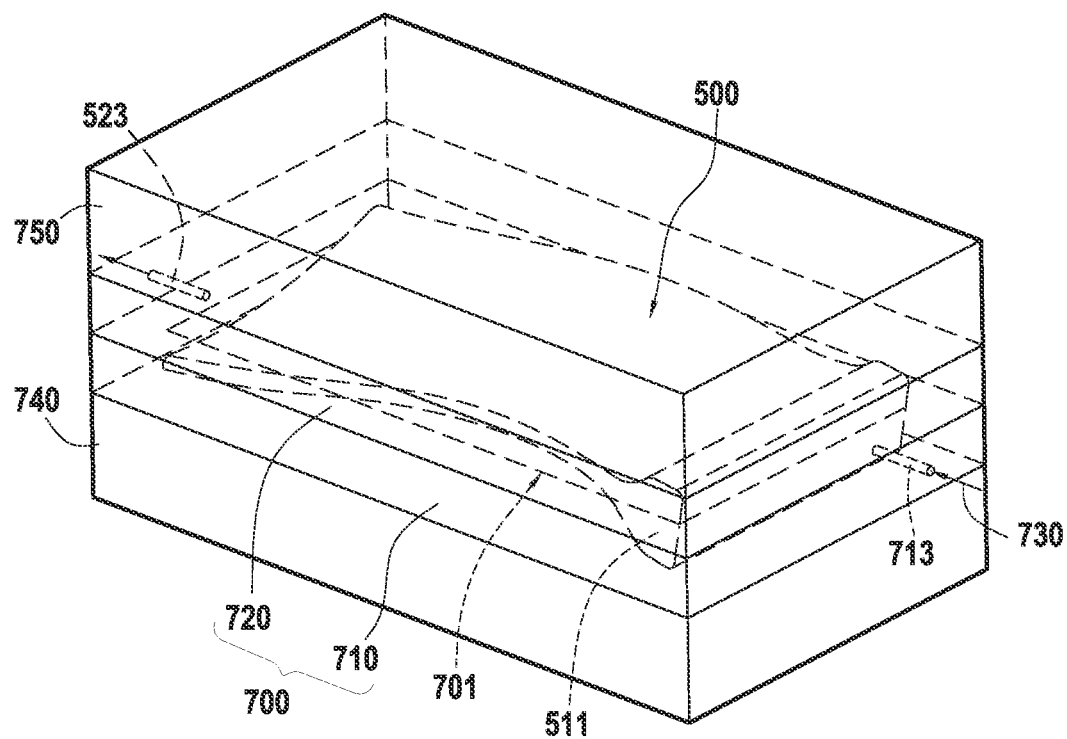

[Fig.10]
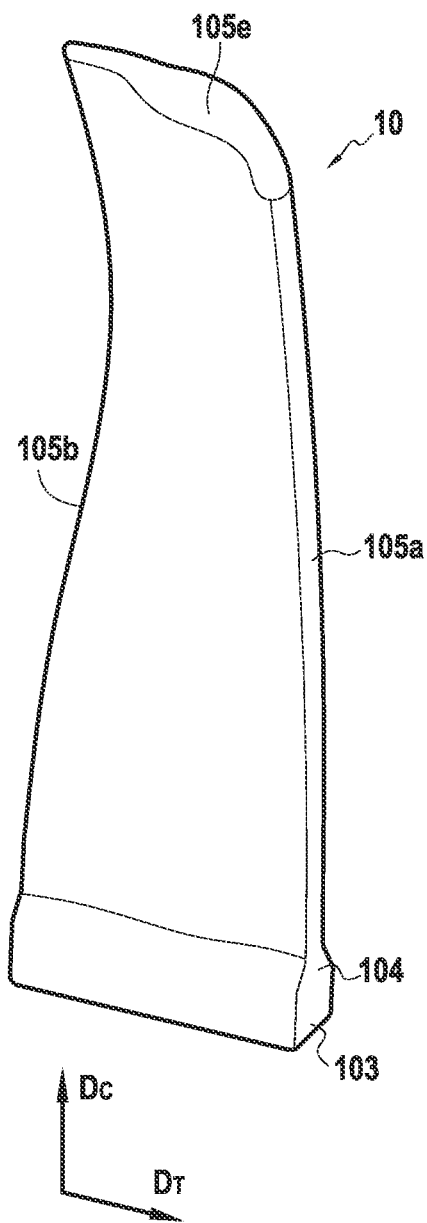

PROCESS FOR MANUFACTURING A FIBROUS PREFORM FOR REINFORCEMENT OF PARTS MADE OF COMPOSITE MATERIAL WITH A HIGH LOCAL VARIATION IN THICKNESS

CROSS-REFERENCE TO RELATED APPLICATIONS

This application is the U.S. National Stage of PCT/FR2020/051153, filed Jul. 1, 2020, which in turn claims priority to French patent application number 1907716 filed Jul. 10, 2019. The content of these applications are incorporated herein by reference in their entireties.

TECHNICAL FIELD

The present invention concerns the creation of composite material parts and, more particularly, the creation by three-dimensional (3D) or multilayer weaving of reinforcement fibrous textures for such parts.

PRIOR ART

One field of application of the invention is the creation of structural composite material parts, i.e., structural parts with fibrous reinforcement densified by a matrix.

Composite materials make it possible to create parts having a lower overall mass than these same parts when they are made of metal.

The invention more particularly concerns parts of composite material locally having one or more extra-thick portions as is the case, for example, for the root of an aircraft engine blade which corresponds to an area of high variation in thickness in the composite material part. In the case of a composite material having a changing thickness, the change in thickness is controlled at the level of the fibrous texture intended to form the reinforcement of the part.

Creating blades of composite material for turbomachines has already been proposed. We refer notably to the documents U.S. Pat. No. 7,101,154 and US 2011/0311368 which describe a solution consisting of increasing the count (therefore the cross section) of threads in the extra-thick parts in order to reduce the capacity to decrease thickness when shaping the 3D fibre texture with compression. However, the use of threads of high count locally increases the amount of fibres in the preform. If the amount of fibres is too large, the resulting porosity network may not be sufficient to permit good access of the constituents of the matrix to the core of the preform and to obtain, consequently, a homogeneous composite material having good mechanical properties.

DISCLOSURE OF THE INVENTION

It is therefore desirable to be able to provide fibrous 3D or multilayer preforms having extra-thick parts that do not have the above-mentioned disadvantages.

For this purpose, according to the invention a manufacturing process is proposed for a fibrous preform fora composite material part, the process comprising the following steps:

creating a fibrous texture by three-dimensional or multilayer weaving between a plurality of weft layers and warp layers, the fibrous texture comprising an extra-thick portion having a sacrificial portion and useful portion adjacent to said sacrificial portion in the in the warp direction, the sacrificial portion, placing the fibrous texture in a forming toolset,
shaping the fibrous texture so as to obtain a fibrous preform having a sacrificial portion and an adjacent useful portion,
removing the sacrificial portion of the fibrous preform,
process in which, when weaving the fibrous blank, one or more expansion elements are inserted into the weft layers located at the core of the sacrificial portion of the fibrous texture, each expansion element having a cross-section greater than the cross-section or count of the weft threads or strands present in the useful portion.

The insertion of expansion elements in the sacrificial portion in the weft layers at the core of the fibrous texture makes it possible to expand or inflate the fibrous texture substantially both in the sacrificial portion and the useful portion. Consequently, it is possible to obtain a more substantial expansion or swelling of the useful portion. Without the sacrificial portion comprising expansion elements having a section greater than the section or count of the weft threads or strands present in the useful portion, it would be necessary to insert into the useful portion a large quantity of threads or strands of large cross-section in order to attain the desired thickness as is the case for solutions of the prior art. However, in this case, the amount of fibres in the extra-thick portion becomes too high and poorly compatible with a densification and optimal mechanical characteristics. Indeed, if the amount of fibres is too great, it is more difficult to introduce a matrix precursor into the entire porosity of the fibrous reinforcement. Moreover, if the amount of fibres is too great, the quantity of matrix deposited will be low, which could degrade the mechanical characteristics of the composite material obtained.

The expansion elements are confined to the sacrificial portion, which makes it possible to use threads or strands in the useful portion compatible with the target amount of fibres. In other words, the invention makes it possible to obtain substantial expansion in the useful portion by using expansion elements which are located in the sacrificial portion, portion intended to be eliminated from the final preform later. Thus, the size of the cross-section and the quantity of expansion elements can be defined solely with regard to the need for thickness in the useful portion, the size of the threads or strands present in the useful portion being able to be defined solely to attain the amount of fibres sought. Thus a useful portion is obtained that meets both the dimensional requirements by having the desired thickness and the manufacturing requirements by having a controlled amount of fibres compatible with a densification process and good mechanical properties of the final composite material.

In one embodiment, braids are inserted into the weft layers located at the core of the sacrificial portion of the fibrous texture, each braid having a cross-section greater than the cross-section or count of the weft threads or strands present in the useful portion.

According to one particular characteristic, weft layers located near weft layers comprising the braids comprise threads or strands having a count greater than the count of the threads or strands of the weft layers located in the skin of the sacrificial portion.

According to another particular characteristic, the braids have a cross-section corresponding to a count of 5K (5000 filaments), the threads or strands of the weft layers located near the weft layers comprising the braids comprise threads or strands having a count comprised between 1K (1000 filaments) and 4K (4000 filaments), the threads or strands of the weft layers located in the skin of the sacrificial portion having a count of 0.5K (500 filaments).

In another example of embodiment, the sacrificial portion and the useful portion comprise the same number of warp threads continuously woven between said parts. The fibrous texture of the invention is entirely textile (i.e., without addition of an insert) and the threads thereof are connected together by 3D or multilayer weaving, which allows the structure to be resistant to delamination.

The invention also relates to a manufacturing process for a composite material part comprising the following steps:
- creating a fibrous preform conforming to the manufacturing process for a fibrous preform according to the invention,
- injecting a liquid composition comprising at least one matrix material precursor into the fibrous preform,
- transforming the liquid composition into matrix so as to obtain a composite material part comprising a fibrous reinforcement densified by a matrix.

The process can especially be used for the manufacture of a turbomachine blade of composite material, for example a turbine blade, especially a gas turbine blade for aircraft engines.

BRIEF DESCRIPTION OF THE DRAWINGS

FIG. 1 very schematically illustrates a three-dimensional woven fibrous blank intended to create a fibrous texture conforming to an embodiment of the invention, FIG. 2 is a warp cross-sectional view in an enlarged scale partially showing a plan of a weaving pattern for an extra-thick portion of the fibrous texture of FIG. 1, FIG. 3 is a schematic view of a fibrous texture obtained from the fibrous blank of FIG. 1, FIG. 4 is an exploded perspective schematic view showing a forming toolset conforming to one embodiment of the invention and the placement of the fibrous texture of FIG. 3 inside of it, FIG. 5 is a perspective schematic view of the toolset of FIG. 4 once mounted, FIG. 6 is a perspective schematic view showing the placement of the forming toolset of FIG. 5 in a press and the performance of a shaping operation by compacting, FIG. 7 shows the removal of a sacrificial portion of a fibrous preform obtained after the shaping operation of FIG. 6, FIG. 8 illustrates the fibrous preform of FIG. 7 after removal of the sacrificial portion, FIG. 9 shows an operation of injecting the matrix precursor liquid composition into the fibrous preform of FIG. 6, FIG. 10 is a perspective schematic view of a composite material blade obtained conforming to a manufacturing process of the invention.

DESCRIPTION OF EMBODIMENTS

The invention generally applies to the creation of fibrous preforms able to constitute fibrous reinforcements for the manufacture of composite material parts, in particular aircraft engine blades, the parts being obtained by densification of the fibrous textures by a matrix. The matrix is typically a resin, in the case of composite materials used at relatively low temperature, typically up to 300° C., or a refractory material such as carbon or ceramic in the case of thermostructural composites.

The fibrous preform of the invention is obtained from a fibrous texture made by three-dimensional weaving or multilayer weaving.

"Three-dimensional weaving" or "3D weaving" means a weaving method by which at least some of the warp threads connect weft threads together on several weft layers.

"Multilayer weaving" here means a 3D weaving with several layers of weft threads whose base pattern of each layer is equivalent to a conventional 2D pattern, such as plain, satin or twill type pattern, but with certain points of the pattern that bind the weft layers together.

The creation of the fibrous texture by 3D or multilayer weaving makes it possible to obtain a connection between the layers and therefore to have a good mechanical strength of the fibrous texture and the composite material part obtained, in a single textile operation.

It is advantageous to promote obtaining, after densification, a surface condition free from significant irregularities, i.e., a good finish condition to avoid or limit finishing operations by machining or to prevent the formation of resin clumps in the case of resin matrix composites. To this end, in the case of a fibrous texture having an internal portion, or core, and an external portion, or skin adjacent to an external surface of the fibrous texture, the skin is preferably created by weaving with a plain, satin or twill type pattern in order to limit surface irregularities, a satin type pattern also providing a smooth surface appearance. A variation of the skin weaving pattern can be created at the external surface of the fibrous texture to confer specific desired properties, for example switching from a plain pattern favoring a tight connection to a satin pattern favoring a smooth surface condition.

It is also advantageous to obtain mechanical properties that are as homogeneous as possible within a composite material part, to promote densification of the reinforcement fibrous texture, with a densification gradient as low as possible between the core of the fibrous texture and its skin, especially in the case of CVI densification. To this end, to promote access to the core of the preform, the weaving at the core can be done by interlock weaving, which offers easy communication between several layers of tissue.

"Interlock weaving" means here a 3D weaving pattern in which each warp layer connects several weft layers with all the threads of the same warp column having the same movement in the plane of the pattern.

The core and the skin can also be created by multilayer weaving with different patterns, especially a satin pattern in the core and a plain or twill pattern in the skin.

It is also possible to vary the pattern of three-dimensional weaving in the core portion, for example by combining different interlock patterns, or an interlock pattern and a multilayer weaving pattern, or even different multilayer weaving patterns. It is also possible to vary the weaving pattern in the skin along the external surface.

It may be desirable to use threads of different chemical natures between different portions of the fibrous texture, especially between the core and the skin to confer specific properties to the composite material part obtained, especially in terms of resistance to oxidation or wear.

Thus, in the case of a thermostructural composite material part with refractory fibre reinforcement, a preform can be used with carbon fibres in the core and ceramic fibres, for example of silicon carbide (SiC) in the skin in order to increase the resistance to wear and oxidation of the composite part at this skin portion.

An example of embodiment of the fibrous texture conforming to the invention will now be described. In this example, weaving is done on a Jacquard loom.

FIG. 1 very schematically shows a fibrous blank 100 from which a fibrous texture 200 is obtained (FIG. 2) intended to form the fibrous reinforcement of an aircraft engine blade.

The blank 100 of the fibrous texture 200 is obtained by three-dimensional weaving, or 3D weaving, or by multilayer weaving performed in a known manner by means of a Jacquard loom on which a bundle of warp threads or strands 201 has been placed in a plurality of layers, the warp threads being connected by weft layers 202 also arranged in a plurality of layers, some weft layers comprising braids as explained in detail below. A detailed example of embodiment of a fibrous preform intended to form the fibrous reinforcement of an aircraft engine blade is especially described in detail in documents U.S. Pat. Nos. 7,101,154, 7,241,112 and WO 2010/061140.

The fibrous blank 100 is woven in the form of a strip extending generally in a direction $D_C$ corresponding to the direction of the warp threads 201 and in the longitudinal direction of the blade to be created. In the fibrous blank 100, the fibrous texture has a variable thickness both in the $D_C$ direction and in the $D_T$ direction perpendicular to the $D_C$ direction and corresponding to the direction of the weft threads 202. The thickness variations are determined according to the longitudinal thickness and the profile of the vane of the blade to be created. In its portion intended to form a preform of the root, the fibrous texture 200 has in the $D_C$ direction an extra-thick portion 203 determined according to the thickness of the blade root to be created. The fibrous texture 200 extends by a portion of decreasing thickness 204 intended to form the support of the blade by a portion 205 intended to form the vane of the blade. Fibrous texture 200 is woven in a single piece and must have, after cutting of the unwoven threads, the near-final shape and dimensions of the blade ("net shape"). To this end, in the portions of the variations of thickness of the fibrous texture, such as the portion of decreasing thickness 204, the reduction of thickness of the preform is obtained by progressively removing layers of weft during weaving.

Conforming to the invention, the fibrous texture 200 has, at the extra-thick portion 203, a sacrificial portion 210 present at the lower end of the texture and a useful portion 211 adjacent to the sacrificial portion 210 along the weft direction $D_C$. Still conforming to the invention, one or more expansion elements are inserted into the weft layers located at the core of the sacrificial portion 203 of the fibrous texture 200, each expansion element having a cross-section greater than the cross-section or count of the weft threads or strands present in the useful portion 211. As explained below, the sacrificial portion 210 is intended to be eliminated from the fibrous preform obtained after shaping of the fibrous texture in order only leave therein the useful portion 211 which is intended to form the blade root.

FIG. 2 is a partial enlarged view of a warp sectional plane of a weaving pattern of the extra-thick portion 203 of the fibrous texture 200 comprising the sacrificial portion 210 and the useful portion 211 obtained by 3D weaving. In this example, the fibrous texture 200 comprises, in its extra-thick portion 203, 48 weft layers, or 24 half-layers t1 to t48. In the core 2103 located between the opposed skins 2032 and 2033, the weft layers are connected together by warp threads 201 according to a 3D weaving of the interlock type. In the skins 2032 and 2033, the weaving between the warp threads 201 and the weft threads 202 is two-dimensional, with an irregular satin pattern. The satin weaving only concerns the weft half-layers t1 and t2 and the weft half-layers t47 and t48. It will be noted that the interlock 3D weaving of the core extends to the extreme half-layers t1, t48 of the skins in order to connect these half-layers to those of the core.

In the example described here, the sacrificial portion 210 has a first area 2101 of the side opposite the useful portion 211 along the warp direction $D_C$ and a second area 2102 adjacent to both the first area 2101 and the useful portion 211. In the first area 2101, braids 10 are used in the most central weft layers of the fibrous texture 200. In the example described here, braids 10 are used as expansion elements in half-layers t21 to t23. Braids 10 have a cross-section or diameter of 1.55 mm. All the other threads or strands present in the weft layers of the extra-thick portion 203 have a count corresponding to a cross-section less than that of the braids. The extra-thick portion 203 here comprises threads or strands 20, 30 and 40 having, respectively, a count of 2K (2000 filaments), 1.5K (1500 filaments) and 0.5K (500 filaments), respectively corresponding to a cross-section or a diameter of 0.41 mm, 0.30 mm and 0.15 mm.

The insertion of braids 10 in the sacrificial portion 210 in the weft layers at the core of the fibrous texture makes it possible to expand or inflate the fibrous texture substantially both in the sacrificial portion 210 and the useful portion 211. Indeed, the expansion of the sacrificial portion 210 due to the presence of the braids is reflected in the adjacent useful portion 211, especially due to the fact that these two parts are adjacent and connected together by a continuous weaving with the warp threads.

Consequently, it is possible to obtain a more substantial expansion or swelling of the useful portion. Without the sacrificial portion comprising expansion elements having a section greater than the section or count of the weft threads or strands present in the useful portion, it would be necessary to insert into the useful portion a large quantity of threads or strands of large cross-section in order to attain the desired thickness as is the case for solutions of the prior art. However, in this case, the amount of fibres in the extra-thick portion becomes too high and poorly compatible with a densification and optimal mechanical characteristics. Indeed, if the amount of fibres is too great, it is more difficult to introduce a matrix precursor into the entire porosity of the fibrous reinforcement. Moreover, if the amount of fibres is too great, the quantity of matrix deposited will be low, which could degrade the mechanical characteristics of the composite material obtained.

The braids are confined to the sacrificial portion, which makes it possible to use threads or strands in the useful portion compatible with the target amount of fibres. In other words, the invention makes it possible to obtain substantial expansion in the useful portion by using expansion elements which are located in the sacrificial portion, portion intended to be eliminated from the final preform later. Thus, the size of the cross-section and the quantity of expansion elements can be defined solely with regard to the need for thickness in the useful portion, the size of the threads or strands present in the useful portion being able to be defined solely to attain the amount of fibres sought. Thus a useful portion is obtained intended to form a blade root here that meets both the dimensional requirements by having the desired thickness and the manufacturing requirements by having a controlled amount of fibres, typically less than 50%, compatible with a densification process and good mechanical properties of the final composite material.

As illustrated in FIG. 2, the weft layers adjacent to those comprising the braids 10 comprise threads or strands 30 having a count comprised between 1K and 4K while the weft layers present in the skin comprise threads or strands having a count of 0.5K. Thus the thickness is progressively decreased without creating "holes" in the fibrous texture, which makes a smoother textile transmission possible.

In the second area 2102 of the sacrificial portion 210, the weft layers predominantly comprise threads or strands having a count of 2K except for the weft layers present near the skins which comprise threads or strands having a count of 1.5K while the weft layers present in the skin comprise threads or strands of 0.5K. This distribution of the count or size of the threads or strands makes it possible to obtain smoother textile transmissions avoiding the creation of holes while ensuring a targeted fibre volume ratio and thickness.

In the useful portion 211, the weft layers located below the skins predominantly comprise threads or strands 30 having a count of 1.5K at the junction with the sacrificial portion 210, the threads or strands 30 being progressively replaced by threads or strands 40 having a count of 0.5K like the threads or strands present in the skin.

The fibrous texture according to the invention can be woven especially, but not exclusively, from threads of carbon fibres, ceramic fibres such as silicon carbide or oxide fibres such as alumina.

Once the weaving of fibrous texture 200 into blank 100 is completed, the unwoven threads are cut to extract the fibrous texture. Thus the fibrous texture 200 is obtained illustrated in FIG. 3 and woven in a single piece.

The next step consists of shaping by compacting the fibrous texture 200 to form a fibrous preform ready to be densified. To this end, the fibrous texture is placed in a forming toolset 300 which, as illustrated in FIG. 4, comprises a first shell 310 having in its centre a first cavity 311 partially corresponding to the shape and dimensions of the blade to be created, cavity 311 being surrounded by a first contact plane 312.

Toolset 300 also comprises a second shell 320 having in its centre a second cavity 321 partially corresponding to the shape and dimensions of the blade to be created, the second cavity 321 being surrounded by a second contact plane 322 intended to cooperate with the first contact plane 312 of the first shell 310.

The fibrous texture 200 is first positioned in the cavity 311 of the first shell 310, the second shell 320 being then positioned on the first shell 310 in order to close forming toolset 300. Once forming toolset 300 is closed as illustrated in FIG. 5, the first and second shells are in a so-called "assembly position", i.e., a position in which the first and second cavities 310, 320 are placed facing one another while the first and second contact planes 312 and 322 are also facing one another. In this configuration, the first and second cavities 310, 320 together define an internal volume 301 having the shape of a blade to be created and in which the fibrous texture 200 is placed. In the example described here, the cavity 311 is intended to form the intrados side of the blade fibrous preform while the cavity 321 is intended to form the extrados side of the blade preform. Due to the presence of the sacrificial portion 210 adjacent to useful portion 211, this portion has a sufficient thickness to fill the enlarged portion 3010 of the internal volume 301 intended to form the root of the blade.

In FIG. 6, the forming toolset 300 with the fibrous texture 200 therein is placed in a compaction press 400. Press 400 comprises a lower portion 410 in which the first shell 310 of the forming toolset 300 rests and an upper portion 420 placed in the second shell 320 of the forming toolset 300.

As shown in FIG. 6, the forming toolset 300 is subjected to the application of a compacting pressure PC applied by press 400. The application of the pressure PC causes the first and second shells 310 and 320 to come together until the first and second contact planes 312 and 322 meet, which makes it possible both to compact the fibrous texture 200 according to a determined rate of compaction in order to obtain an amount of fibres which is also determined and to shape the fibrous texture according to the profile of the blade to be manufactured. Thus a fibrous preform 500 is obtained having the shape of the blade to be created and bearing a sacrificial portion 510 corresponding to the sacrificial portion 210 of the fibrous texture 200 and an adjacent useful portion 511 corresponding to the useful portion 211 of texture 200.

The fibrous preform 500 is then extracted from the toolset 300 in order to remove the sacrificial portion 510 as illustrated in FIG. 7. The sacrificial portion can be removed by conventional machining such as cutting with a diamond tool, for example.

Then a fibrous preform 500 is obtained whose lower end only bears useful portion 511 as the extra-thick portion intended to form the root of the blade. The useful portion 511 is extended by a portion of decreasing thickness 504 corresponding to the portion 204 of the fibrous texture 200. The preform 500 also comprises a vane portion 505 corresponding to the portion 205 of the fibrous texture 200 which extends along the direction DT between a leading edge portion 505a and trailing edge portion 505b corresponding respectively to edges 205a and 205b of the fibrous texture 200.

Then the fibrous preform is densified. The densification of the fibrous preform intended to form the fibrous reinforcement of the part to be manufactured consists of filling the porosity of the preform, in all or part of the volume thereof, by the material making up the matrix. This densification is performed in a manner known in itself according to the liquid process (LP). The liquid process consists of impregnating the preform with a liquid composition containing a matrix material precursor. The precursor is usually present in the form of a polymer, such as a high performance epoxy resin, optionally diluted in a solvent. The preform is placed in a mould that can be closed tightly with a recess having the shape of the final moulded blade. Then the mold is closed and the matrix precursor liquid (for example a resin) is injected into the entire recess to impregnate the entire fibrous part of the preform.

The transformation of the precursor into matrix, i.e., its polymerization, is performed by heat treatment, generally by heating the mould, after eliminating any solvent and cross-linking the polymer, the preform being still held in the mould having a shape corresponding to that of the part to be created.

In the case of the formation of a carbon or ceramic matrix, the heat treatment consists of pyrolyzing the precursor to transform the matrix into a carbon or ceramic matrix depending on the precursor used and the pyrolysis conditions. By way of example, liquid ceramic precursors, especially of SiC, can be resins of the polycarbosilane (PCS) or polytitanocarbosilane (PTCS) or polysilazane (PSZ) type, while liquid carbon precursors can be resins with a relatively high coke content such as phenolic resins. Several consecutive cycles, from impregnation to heat treatment, can be performed to arrive at the desired degree of densification.

According to one aspect of the invention, especially in the case of the formation of an organic matrix, the fibrous preform can be densified by the well-known process of resin transfer moulding RTM. Conforming to the RTM process, the fibrous preform is placed in a mould having the outer shape of the part to be created. A thermosetting resin is injected into the internal space of the mould which comprises the fibrous preform. A pressure gradient is generally established in this internal space between the place where the resin is injected and the discharge orifices thereof in order to control and optimize the impregnation of the preform by the resin.

The injection of a liquid matrix precursor composition into the fibrous texture as well as its transformation into matrix are performed in an injection toolset 700 shown in FIG. 9. Like for the forming toolset 300, the injection tool 700 comprises a first shell 710 comprising at its centre a first cavity partially corresponding to the shape and dimensions of the blade to be created and a second shell 720 comprising in its centre a second cavity partially corresponding to the shape and dimensions of the blade to be created. Once toolset 700 is closed as illustrated in FIG. 9, the first and second cavities, respectively first and second shells 710 and 720 together define an internal volume 701 having the shape of the blade to be created and in which the fibrous preform 500 is placed.

Toolset 700 also comprises means making it possible to perform the injection of a liquid matrix precursor and the transformation of this precursor into matrix. More precisely, in the example described here, the first shell 710 of toolset 700 comprises an injection port 713 intended to allow the injection of a liquid matrix precursor composition into the fibrous preform while the second shell comprises a discharge port 723 intended to cooperate with a pump system for creating a vacuum in the toolset and drawing off air during injection. The injection toolset 700 also comprises a lower part 740 and an upper part 750 between which the first and second shells 710 and 720 are placed, the lower part 740 and the upper part 750 being equipped with heating means (not shown in FIG. 9).

Once toolset 700 is closed, the blade is moulded by impregnating the preform 500 with a thermosetting resin that is polymerized by heat treatment. For this purpose, the well known resin transfer moulding process is used. Conforming to the RTM process, a resin 730, for example a thermosetting resin, is injected via the injection port 713 of the first shell 710 into the internal volume occupied by the preform 500. The port 723 of the second shell 720 is connected to a discharge pipe maintained under pressure (not shown in FIG. 9.). This configuration makes it possible to establish a pressure gradient between the lower part of the preform 500 where the resin is injected and the upper part of the preform located near port 723. In this way, the resin 730 injected essentially at the lower part of the preform will progressively impregnate the entire preform by circulating therein to the discharge port 723 by which the surplus is discharged. Of course, the first and second shells 710 and 720 of the toolset 700 can respectively comprise several injection ports and several discharge ports.

The resin used can be, for example, an epoxy resin of temperature class 180° C. (maximum temperature supported without loss of characteristics). The resins suited for RTM processes are well known. They preferably have a low viscosity to facilitate their injection into the fibres. The choice of temperature class and/or the chemical nature of the resin is determined depending on the thermomechanical stresses to which the part must be subjected. Once the resin is injected throughout the entire reinforcement, it is polymerized by heat treatment conforming to the RTM process.

After injection and polymerization, the blade is demoulded. It can optionally undergo a post-curing process to improve its thermomechanical characteristics (increase in the glass transition temperature). Finally, the blade is trimmed to remove excess resin and the chamfers are machined. No other machining is necessary since the part, being moulded, complies with the required dimensions.

The fibrous preform can also be densified in a known manner, by chemical vapor infiltration (CVI). The fibrous preform corresponding to the fibrous reinforcement of the blade to be created is placed in an oven into which a reaction gas phase is admitted. The pressure and the temperature prevailing in the oven and the composition of the gas phase are chosen so as to allow the diffusion of the gas phase within the porosity of the preform to form the matrix therein by deposition, in the core of the material in contact with the fibres, of a solid material resulting from a decomposition of a constituent of the gas phase or from a reaction between several constituents, unlike the pressure and temperature conditions specific to the chemical vapor deposition (CVD) processes which lead to exclusively to a deposit on the surface of the material.

The formation of a SiC matrix can be obtained with methyltrichlorosilane (MTS) giving SiC by decomposition of MTS while a carbon matrix can be obtained with hydrocarbon gases such as methane and/or propane giving carbon by cracking.

A densification combining the liquid and gaseous method can also be used to facilitate the implementation, limit costs and manufacturing cycles while obtaining satisfactory characteristics for the usage envisioned.

The preform can also be densified by slurry cast, of a slurry containing SiC and organic binders, for example, followed by melt infiltration with liquid silicon.

The densification processes described above make it possible to create, from the fibrous preform of the invention, primarily composite material parts with organic matrix (OMC), carbon matrix (C/C) and ceramic matrix (CMC).

As illustrated in FIG. 10, a blade 100 is then obtained formed of a fibrous reinforcement densified by a matrix that has in its lower part a root 103 formed by the useful portion 511 of the fibrous preform 500 which is extended by a support 104 formed by the decreasing thickness portion 504 of the preform 500 and a vane 105 formed by the vane portion 505 of fibrous preform 500. Vane 105 has a leading edge 105a and a trailing edge 105b respectively corresponding to edges 505a and 505b of the fibrous preform 500.

The fibrous texture and its manufacturing process according to the present invention can notably be used to create turbomachine blades having a more complex geometry that the blade represented in FIG. 10, such as blades having, in addition to that of FIG. 10, one or more platforms making it possible to perform functions such as vein sealing, anti-tilt, etc.

In another example of embodiment, one or more pins can be inserted into the weft layers at the core of the sacrificial portion of the fibrous texture as an expansion element. Each pin has a cross-section greater than the cross-section or count of the weft threads or strands present in the useful portion.

The invention claimed is:

1. A manufacturing process of a fibrous preform for a composite material part, the process comprising:
    creating a fibrous texture by three-dimensional or multi-layer weaving between a plurality of weft layers and warp layers, the fibrous texture comprising an extra-thick portion having a sacrificial portion and a useful portion adjacent to said sacrificial portion in the warp direction,
    placing the fibrous texture in a forming toolset, shaping the fibrous texture so as to obtain a fibrous preform having a sacrificial portion and an adjacent useful portion, and removing the sacrificial portion from the fibrous preform, process in which, when weaving the fibrous blank, one or more expansion elements are inserted into the weft layers located at the core of the sacrificial portion of the fibrous texture, each expansion element having a first cross-section greater than the cross-section or count of the weft threads or strands present in the useful portion, wherein all of the one or more expansion elements having said first cross-section are confined solely in the sacrificial portion and each weft thread or strand of the weft layers of the useful portion of the extra-thick portion has a count that is smaller than the count of any of the expansion elements, and wherein all of the one or more expansion elements inserted into the weft layers and having said first cross-section are removed-during said removing and prior to any densification of the fibrous preform.

2. The manufacturing process according to claim 1, wherein when weaving the fibrous blank, braids are inserted into the weft layers located at the core of the sacrificial portion of the fibrous texture to form said one or more expansion elements, each braid having a cross-section greater than the cross-section or count of the weft threads or strands present in the useful portion.

3. The manufacturing process according to claim 2, wherein weft layers located near weft layers comprising the braids comprise threads or strands having a count greater than the count of the threads or strands of the weft layers located in the skin of the sacrificial portion.

4. The manufacturing process according to claim 3, wherein the braids have a cross-section corresponding to a count of 5K, the threads or strands of the weft layers located near the weft layers comprising the braids comprise threads or strands having a count comprised between 1K and 4K, the threads or strands of the weft layers located in the skin of the sacrificial portion having a count of 0.5K.

5. The manufacturing process according to claim 2, wherein the sacrificial portion and the useful portion comprise the same number of warp threads woven continuously between said sacrificial portion and said useful portion.

6. The manufacturing process according to claim 1, wherein when weaving the fibrous blank, at least one pin is inserted into the weft layers located at the core of the sacrificial portion of the fibrous texture, each pin having a cross-section greater than the cross-section or count of the weft threads or strands present in the useful portion.

7. A process for manufacturing a composite material part comprising:

creating a fibrous preform conforming to the manufacturing process for a fibrous preform according to claim 1, injecting a liquid composition comprising at least one matrix material precursor into the fibrous preform, transforming the liquid composition into matrix so as to obtain a composite material part comprising a fibrous reinforcement densified by a matrix.

8. A method comprising manufacturing a turbomachine blade of composite material with the process of claim 7.

* * * * *